United States Patent [19]

Harary et al.

[11] Patent Number: 4,890,878
[45] Date of Patent: Jan. 2, 1990

[54] VEHICULAR ARMREST

[76] Inventors: Eli D. Harary; Cathy Harary, both of 7630 Aston Ct., West Hills, Calif. 91304; Peter A. Madnick, 627 Valley Oak La., Thousand Oaks, Calif. 91360; Russell W. Sherwood, 3719 N. Wells, Kingman, Ariz. 86401

[21] Appl. No.: 276,481
[22] Filed: Nov. 28, 1988
[51] Int. Cl.⁴ .................................. B60J 9/00
[52] U.S. Cl. ................................ 296/153; 297/413; 108/46; 108/96
[58] Field of Search ............... 296/153; 297/412, 413; 248/118, 408; 108/46, 47, 96

[56] References Cited

U.S. PATENT DOCUMENTS

| 185,004 | 12/1876 | White | 248/408 |
| 1,873,414 | 8/1932 | Jarvis | 297/413 |
| 1,904,800 | 4/1933 | Pittman | 297/413 |
| 3,603,637 | 9/1971 | DePinto | 297/413 |
| 3,646,623 | 3/1972 | Harris et al. | 248/408 X |
| 4,165,854 | 8/1979 | Duly | 248/408 |
| 4,810,026 | 3/1989 | Doane | 296/153 |

FOREIGN PATENT DOCUMENTS 531897  1/1941  United Kingdom ............... 297/413

Primary Examiner—Dennis H. Pedder
Attorney, Agent, or Firm—Jack C. Munro

[57] ABSTRACT

An armrest to suspendingly engage within the window opening of an automobile door or other similar type of vehicular window. The armrest is to be adjustable to any desired position within the window opening. The armrest includes a fixed cushioning pad and a movably adjustable cushioning pad.

6 Claims, 1 Drawing Sheet

VEHICULAR ARMREST

BACKGROUND OF THE INVENTION

The field of this invention relates to an armrest attachable to a door of a vehicle and usable by either the driver of the vehicle or the passenger of the vehicle.

The armrest of the present invention is going to be discussed primarily in conjunction with an automobile. However, it is considered to be within the scope of this invention that the armrest can be utilized in conjunction with other vehicles such as trains, trucks and possibly even aircraft.

Armrests, designed principally for use in conjunction with automobiles, have long been known. Examples of such armrests are shown and described within U.S. Pat. Nos. 1,426,787; 1,742,447; 1,760,450; 1,892,048; and 3,603,637.

However, within recently manufactured automobiles, the automobile doors on both the passenger side and the driver side are incorporating little provision for the resting of one's arm. There is also little provision having to do with accommodating both a small size of individual and also accommodating a large size of individual. Still further, it used to be that automobiles were manufactured in such a manner that one could rest one's arm on the window ledge when the window was open and find it comfortable to do so. However, automobiles at the present time are being manufactured in such a manner that there is located a weather stripping across the ledge of the window which makes it uncomfortable for one to rest his/her arm on the window ledge when the window is open.

Also, armrests of the prior art were designed to accommodate the position of the arm in only a single position. That position could be varied by adjusting of the armrest, but still, only a single position of the arm could be accommodated once the armrest was fixed in the particular established position. It would be desirable to design an armrest which had a plurality of resting positions incorporated within the armrest which would make the armrest more versatile for usage than armrests of the prior art.

SUMMARY OF THE INVENTION

The structure of the present invention provides for an armrest which is to be suspended from the window ledge area of an automobile window. The armrest can be used and set within any longitudinal position within the window opening. Located at the window ledge is a cushioning pad upon which one's arm can be located to comfortably support the arm if the arm is located partially out of the window when the window is open. Also, incorporated within the armrest is a second cushioning pad which is adjustably vertically and fixable in a particular desired vertical position. This adjustment is accomplished through the use of a manually movable spring biased pin which can be engageable with any one in a series of spaced apart holes formed within the main body member of the armrest. The lower end of the armrest includes a resilient bumper to rest against the body of the door to space the lower end of the armrest away from the surface of the door so that the upper surface of the second cushioning pad forms a substantially horizontal arm resting surface.

The primary objective of the present invention is to construct an armrest which is constructed simply and of few parts and can be manufactured inexpensively and therefore sold to the consumer at an inexpensive price.

Another objective of the present invention is to incorporate a plurality of armrest positions within a single armrest structure so that the armrest has increased versatility over the prior art armrests.

Another objective of the structure of this invention is to provide an armrest which can be quickly and easily adjustable within the window opening of an automobile.

Another objective of the present invention is to provide a comfortable support for one's arm but when not in use can be quickly and easily removed and is of a small enough size that it facilitates storage.

Another objective of the present invention is to provide an armrest in which one of the arm resting sections is located against the sill or ledge of the window to support one's arm comfortably and when in operation presents a neat appearance at all times.

Another objective of the present invention is to provide an armrest which may be quickly and easily located in position in conjunction with the door of the automobile eliminating the necessity of any alterations in the body of the automobile in the so locating of the armrest.

DETAILED DESCRIPTION OF THE SHOWN EMBODIMENT

Figure 1:
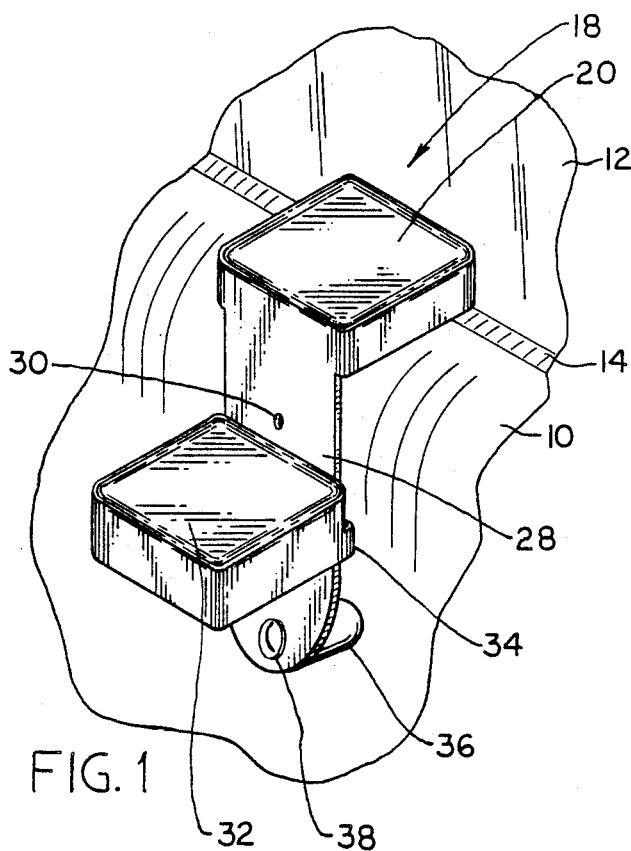
FIG. 1 is an isometric view of the armrest of the present invention showing such mounted in conjunction with the door of an automobile.
Figure 3:
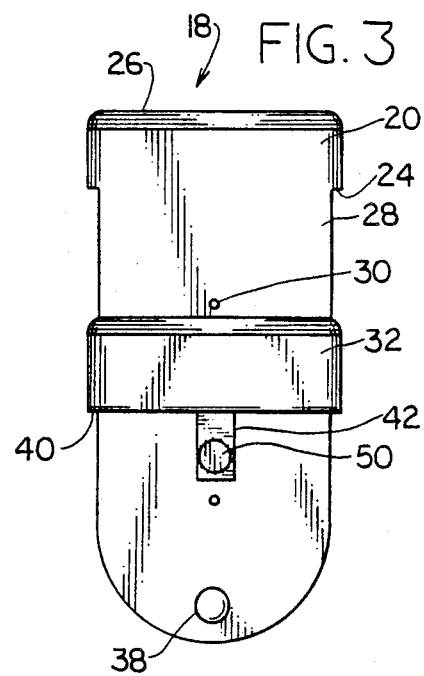
FIG. 3 is front elevational view of the armrest of the present invention.
Figure 2:
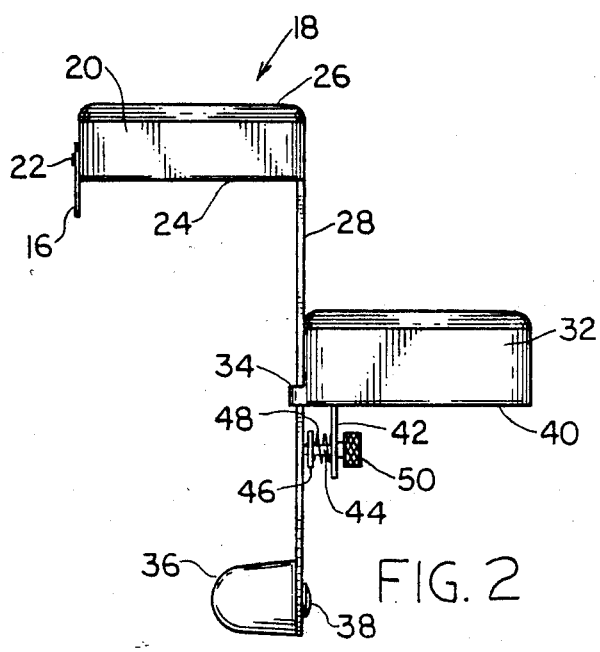
FIG. 2 is a side elevational view of the armrest of the present invention.
Figure 4:
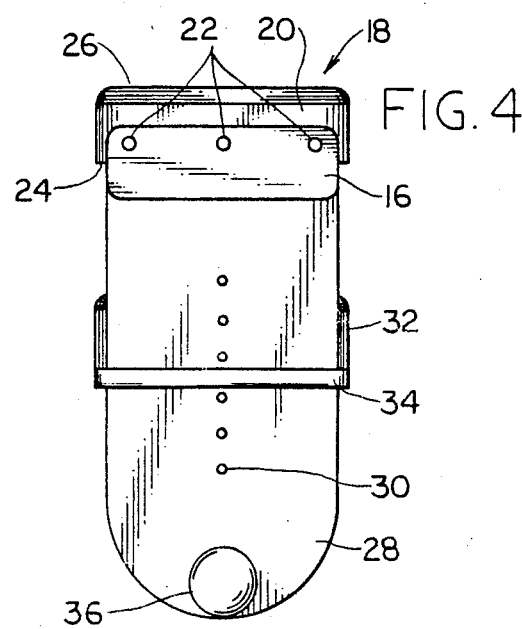
FIG. 4 is a back elevational view of the armrest of the present invention.

Referring particularly to the drawings, there is shown in FIG. 1 the door of a vehicle which has an enclosing wall 10 and a vehicular window 12. The window 12 is to be movable between an open position and a closed position with the closed position being shown. Separating the window 12 and the enclosing wall 10 is a sill or ledge 14. This ledge 14 includes a narrow gap (not shown) and it is within this gap that is to be located the mounting flange 16 of the armrest 18 of the present invention.

In order for the flange 16 to be located within the narrow gap within the ledge 14, it is necessary that the flange 16 be constructed as thinly as possible. It is also important that the flange 16 be rigid and of sufficient strength in order to provide for adequate support for the armrest 18. It is for this reason that the flange 16 will normally be constructed of a thin sheet material metal with, generally, steel being preferred. This flange 16 is fixedly attached to the outer end of a cushioning pad 20. The flange 16 is to be mounted to the pad 20 by means of any conventional fastening means such as a plurality of rivets 22 or the like. The pad 20 has basically a bottom planar surface 24 and an upper rounded surface 26. Normally, the pad 20 will be constructed as an integral molded unit with generally the outer surface of the pad 20 being a sheet plastic or other similar type of material. The interior of the pad 20 will normally include some type of a resilient foam plastic.

The inner edge of the pad 20 is to be integral with a main body member 28. This main body member 28 is to be in a sheet material form and will normally comprise a plastic. This main body member 28 is to be integral with the pad 20.

Within the main body member 28 are located a plurality of spaced apart holes 30. These holes 30 are to be of the same size and the centers of such are located in a single vertical plane. The spacing between each of the holes 30 will normally be equal. In referring to the drawing, there are six in number of the holes 30 being shown. It is to be understood that this number of holes 30 could be increased or decreased without departing from the scope of this invention.

The armrest 18 includes a second cushioning pad 32 which is constructed essentially identical to the cushioning pad 20 and is also the same size. Cushioning pad 32 is attached to U-shaped arm member 34. Within the confines of the U-shaped arm member 34 is located a gap within which is to be located the main body member 28 in close fitting manner. However, sliding movement between the main body member 28 and the cushioning pad 32 will be permitted with the cushioning pad 32 to be movable closer to cushioning pad 20 or further away therefrom. It is to be noted that the cushioning pad 20 extends outwardly from the rear side of the main body member 28 while the cushioning pad 32 extends outwardly from the front side of the main body member 28.

Attached to the rear surface of the main body member 28 is a resilient bumper 36. The attachment to the bumper 36 to the main body member 28 is accomplished by means of a conventional fastener 38. The bumper 36 is located directly adjacent the bottom or lower edge of the main body member 28 which is the portion of the main body member 28 which is spaced furthest from the cushioning pad 20.

Fixedly attached to the undersurface 40 of the cushioning pad 32 is a depending arm 42. The depending arm 42 has a hole located therein within which is mounted a pin 44. The size configuration of the pin 44 is to be just slightly smaller than the size of each of the holes 30 and this outer end is capable of being engaged within any one of the holes 30. Mounted on the pin 44 is an annular flange 46. Located between the annular flange 46 and the arm 42 is located a coil spring 48. The function of the coil spring 48 is to exert a continuous bias tending to locate the pin 44 into connection with one of the holes 30. The outer end of the pin 44 has fixedly attached to a knob 50.

It is to be understood that by manual grasping of the knob 50 and pulling outwardly the coil spring 48 will become compressed and the outer end of the pin 44 will be disengaged from one of the holes 30. This will permit the movement of the cushioning pad 32 relative to the main body member 28 so that the pad 32 can be moved vertically to a position nearer pad 20 or to a position nearer bumper 36. Upon a particular desired vertical position being achieved, the knob 50 is to be released to cause the pin 44 to move against the main body member 28 and rest within one of the holes 30. In this way the cushioning pad 32 is now fixed in position relative to the main body member 28.

What is claimed is:

1. In combination with a vehicle, said vehicle having a passenger compartment formed by an enclosing wall, a window forming part of said enclosing wall, said enclosing wall having a ledge, said ledge located directly adjacent said window, the improvement comprising:
    an armrest having a mounting flange protruding from a main body member, said mounting flange to engage with said ledge and be located against said window;
    a first cushioning pad fixedly mounted on said main body member and located directly adjacent said mounting flange; and
    a second cushioning pad supported by connecting means on said main body member, said connecting means permitting adjusting movement of said second cushioning pad relative to said main body member, said connecting means including position fixing means including a retractable pin engaging said main body for fixing an established position of said second cushioning pad on said main body member, said connecting means comprising a U-shaped arm member enclosing a gap, said main body member being located within said gap adjacent lateral sides of said U-shaped arm member in a manner to substantially prevent said second cushioning pad from rotating about said pin 2. The combination as defined in claim 1 wherein:
    a resilient bumper mounted on said main body member, said resilient bumper to be positioned against said enclosing wall.

3. The combination as defined in claim 2 wherein:
    said first cushioning pad being located on one side of said main body member, said bumper being located on said one side, said second cushioning pad being located on the opposite side of said main body member.

4. The combination as defined in claim 3 wherein:
    said first cushioning pad being approximately the same size as said second cushioning pad.

5. The combination as defined in claim 3 wherein:
    said second cushioning pad being located between said first cushioning pad and said bumper.

6. The combination as defined in claim 1 wherein:
    said position fixing means further comprising a series of spaced apart holes formed within said main body member and said pin being spring biased, manual movement of said spring biased pin will cause disengagement of said pin from a said hole thereby allowing movement of said second cushioning pad relative to said main body member and upon release of said spring biased pin said pin will then engage with another said hole thereby fixing the position of said second cushioning pad relative to said main body member.

* * * * *